US006634220B1

United States Patent
Amano

(10) Patent No.: US 6,634,220 B1
(45) Date of Patent: Oct. 21, 2003

(54) MISFIRE DETECTING APPARATUS FOR AN INTERNAL COMBUSTION ENGINE AND A METHOD FOR DETECTING MISFIRES

(75) Inventor: Hidetoshi Amano, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 178 days.

(21) Appl. No.: 09/671,258

(22) Filed: Sep. 28, 2000

(30) Foreign Application Priority Data

Oct. 13, 1999 (JP) ............................................ 11-290914

(51) Int. Cl.$^7$ ................................................ G01L 3/26

(52) U.S. Cl. ..................................................... 73/117.3

(58) Field of Search .............................. 73/117.3, 116, 73/118.1, 119 R; 701/29; 123/425

(56) References Cited

U.S. PATENT DOCUMENTS 5,415,028 A * 5/1995 Nishimura et al. ......... 73/117.3
6,279,390 B1 * 8/2001 Oka et al. .................. 73/118.1

FOREIGN PATENT DOCUMENTS

| JP | 9-184789 | | 7/1997 | |
|----|----------|---|--------|---|
| JP | 2694878 | | 9/1997 | |
| JP | 2905937 | | 4/1999 | |
| JP | 2905937 | * | 11/1999 | ........... F02D/45/00 |

OTHER PUBLICATIONS

Cal/EPA, Mail–Out # MSC 97–24, Nov. 17, 1997.
Air Resources Board, Mail–Out # MSC 99–12, May 26, 1999.

* cited by examiner

Primary Examiner—Edward Lefkowitz
Assistant Examiner—Maurice Stevens
(74) Attorney, Agent, or Firm—Oliff & Berridge, PLC

(57) ABSTRACT

A misfire detecting apparatus for an internal combustion engine has a start determinator, a rotation counter, a misfire detector, a misfire calculator, a setting means, an abnormality determinator, and a warning means. The start determinator determines a starting condition of the internal combustion engine. The rotation counter counts a total number of rotations of the internal combustion engine. The misfire detector detects a misfire of the internal combustion engine. The misfire calculator calculates a rate of misfire using data from the misfire detector, and the rate of misfire is the number of misfires per a predetermined total number of rotations. The setting means sets a basic rate of misfire in response to the start condition of the internal combustion engine. The abnormality determinator determines an abnormal condition of the internal combustion engine when the rate of misfire calculated by the misfire calculator is greater than the basic rate of misfire set by the setting means. The warning means warns of an abnormality of the internal combustion engine when the abnormality determinator determines an abnormal condition of the internal combustion engine. The detection whether the internal combustion engine is abnormal or not can be accurate by this misfire detecting apparatus.

14 Claims, 8 Drawing Sheets

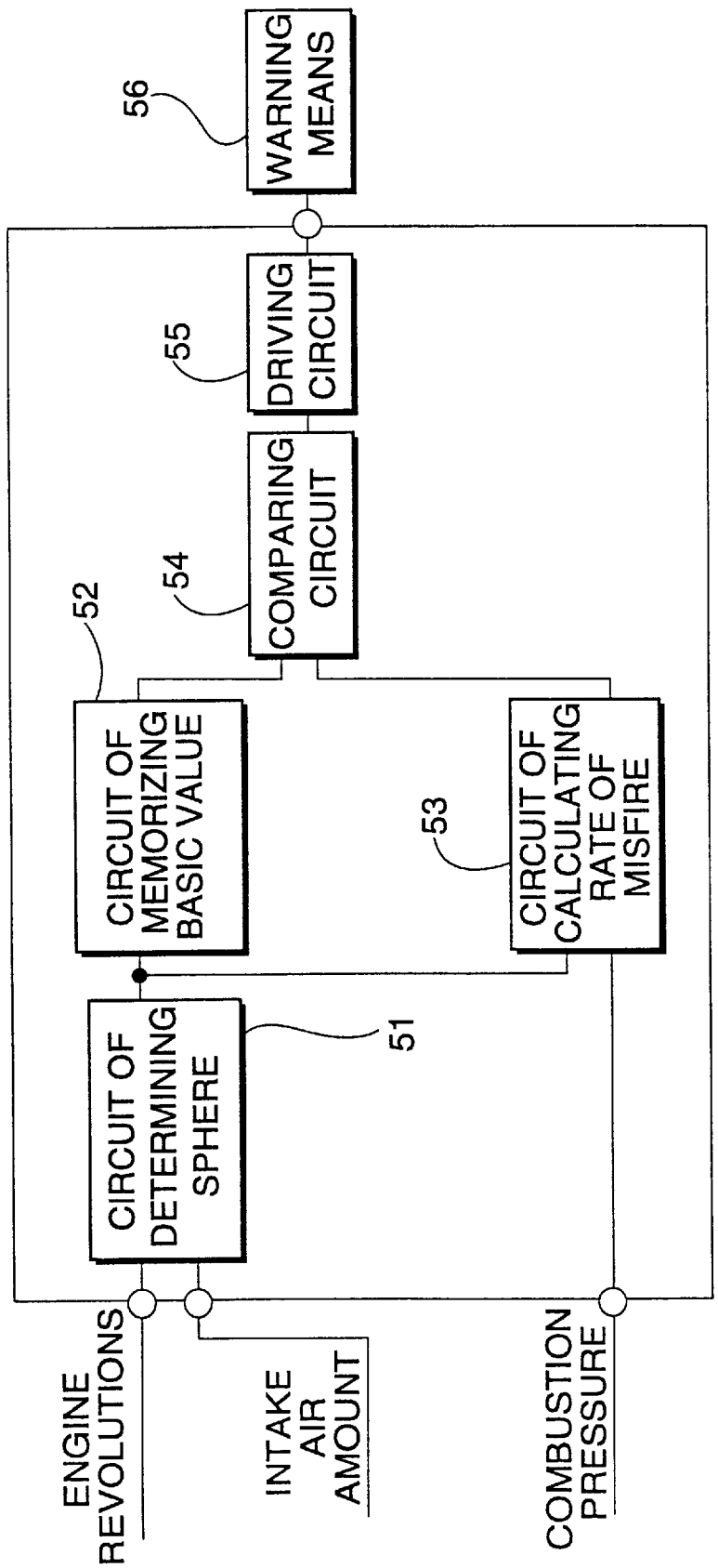

MISFIRE DETECTING APPARATUS FOR AN INTERNAL COMBUSTION ENGINE AND A METHOD FOR DETECTING MISFIRES

FIELD OF THE INVENTION

The present invention relates to an apparatus for detecting misfires of an internal combustion engine and a method for detecting the misfires of the internal combustion engine.

BACKGROUND OF THE INVENTION

One example of a misfire detecting apparatus for an internal combustion engine is shown in Japanese Patent Publication No. 2905937. This apparatus is explained using FIG. 8.

With reference to FIG. 8, a block diagram consists of a circuit of determining sphere 51, a circuit of memorizing a basic value 52, a circuit of calculating a rate of misfire 53, a comparing circuit 54, a driving circuit 55, and a warning means 56. The circuit of determining sphere 51 determines to which sphere a condition of an internal combustion engine belongs by revolutions of the engine and an intake air amount of the engine. The circuit of memorizing a basic value 52 memorizes a basic rate of misfire for which a predetermined value is set in each driving condition sphere. The circuit of calculating a rate of misfire 53 detects misfires of the internal combustion engine by a fluctuation of combustion pressure of the engine at a predetermined crank angle in a predetermined driving sphere of the internal combustion engine, and it calculates the rate of misfire by a number of misfires per a constant number of ignitions of the engine. The comparing circuit 54 compares the actual rate of misfire outputted at the circuit of calculating rate of misfire 53 with the basic rate of misfire outputted at the circuit of memorizing a basic value 52. Furthermore, the comparing circuit 54 determines that the engine is out of order if the detected actual rate of misfire is greater than the basic rate of misfire, and the comparing circuit 54 sends a driving signal indicating that the engine has a problem to the driving circuit 55. The warning means 56 gives an alarm by the signal from the driving circuit 55.

As mentioned above, it is necessary that the basic rate of misfire is low in this misfire detecting apparatus, because an ability of cleansing an exhaust gas of a catalytic converter is low at cold start condition of the internal combustion engine. When the basic rate of misfire remains low, a possibility that the engine is misjudged as a trouble is high, though the misfire is caused by fuel properties (ex. containing alcohol), not by the engine trouble, at hot start condition under which the high basic rate of misfire is allowable because the ability of cleansing by the catalytic converter is high.

SUMMARY Of THE INVENTION

It is thus one object of the present invention to solve the aforementioned problems. That is, the object of the invention is to provide a misfire detecting apparatus for an internal combustion engine which detects a misfire of an internal combustion engine. Another object of the invention is to provide a method of detecting the misfire of the internal combustion engine.

An apparatus for detecting a misfire of an internal combustion engine comprises a start determinator, a rotation counter, a misfire detector, a misfire calculator, a setting means, an abnormality determinator, and a warning means. The start determinator determines a starting condition of the internal combustion engine. The rotation counter counts a total number of rotations of the internal combustion engine. The misfire detector detects a misfire of the internal combustion engine. The misfire calculator calculates a rate of misfire using data from the misfire detector, and the rate of misfire is the number of misfires per a predetermined total number of rotations. The setting means sets a basic rate of misfire in response to the start condition of the internal combustion engine. The abnormality determinator determines an abnormal condition of the internal combustion engine when the rate of misfire calculated by the misfire calculator is greater than the basic rate of misfire set by the setting means. The warning means warns of an abnormality of the internal combustion engine when the abnormality determinator determines abnormal condition of the internal combustion engine.

Since the abnormal condition of the internal combustion engine is determined by comparing the actual rate of misfire with the basic rate of misfire, and since the basic rate of misfire is varied in response to the start condition of the internal combustion engine, a possibility that an incorrect detection whether the engine is abnormal or not could happen can be low. Then, the detection accuracy can be secured.

BRIEF DESCRIPTION OF THE DRAWINGS

The above and other objects, features, advantages, and technical and industrial significance of this invention will be better understood by reading the following detailed description of a presently preferred embodiment of the invention, when considered in connection with the accompanying drawing, in which:

FIG. 8 is a control block diagram showing a known misfire detecting apparatus.

DETAILED DESCRIPTION OF PREFERRED EMBODIMENTS

Figure 1:
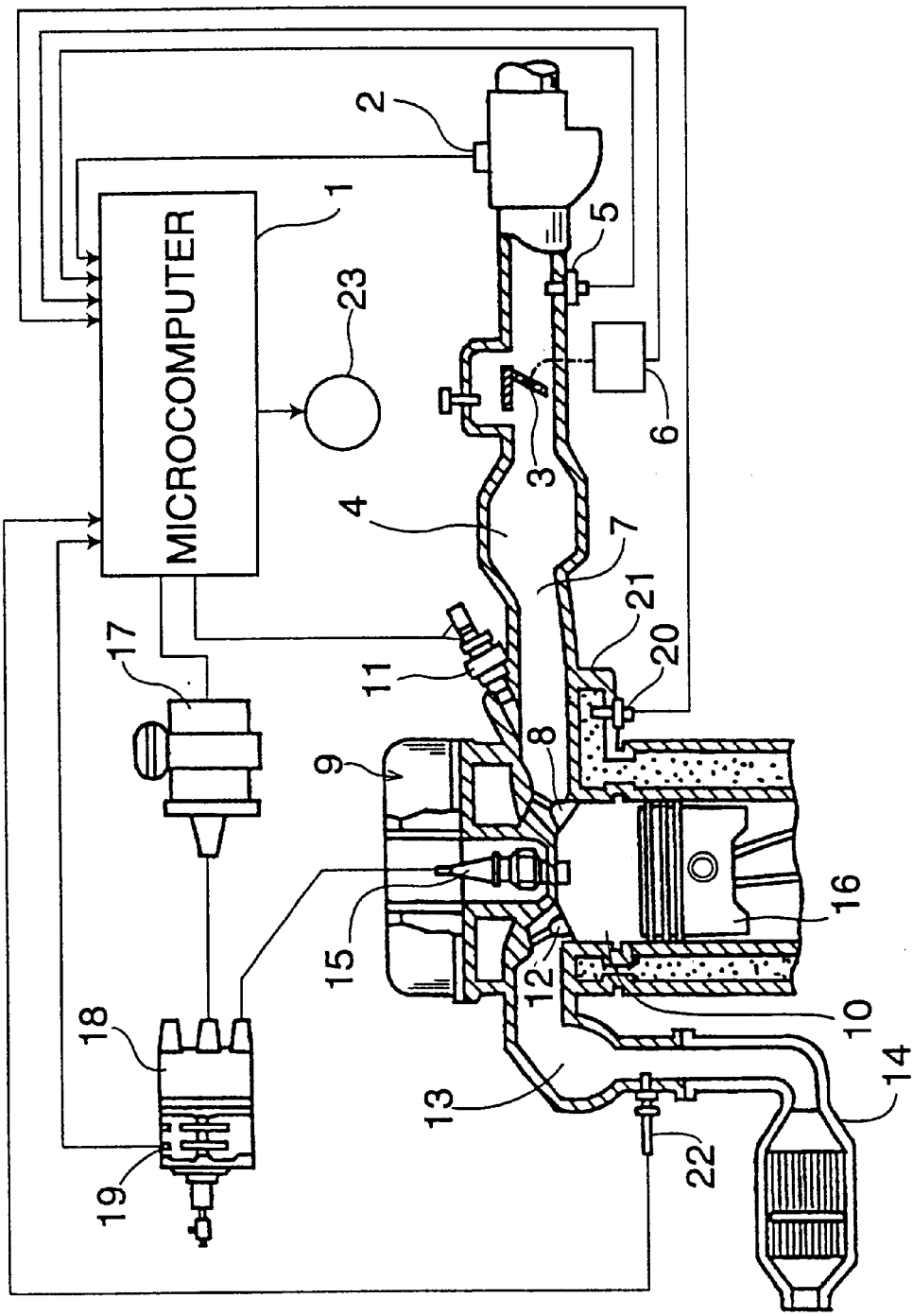
FIG. 1 shows a system of a misfire detecting apparatus for an internal combustion engine 9 as an embodiment of the present invention.

In the following description and the accompanying drawings, the present invention will be described in more detail in terms of specific embodiments. First, FIG. 1 is a system structure showing a misfire detecting apparatus for an internal combustion engine as one embodiment of the present invention. This embodiment is adopted to a four-cylinder and four-cycle spark ignition type internal combustion engine 9. The internal combustion engine 9 is controlled by a microcomputer 1. Incidentally, other types of the internal combustion engines are also within the scope of this invention.

Referring to FIG. 1, a surge tank 4 is downstream of an air flow meter 2, and a throttle valve 3 is between the surge tank 4 and the air flow meter 2. An intake air temperature sensor 5 which detects a temperature of an intake air is provided near the air flow meter 2. An idle switch 6 is attached to the throttle valve 3. The idle switch 6 is turned on when the throttle valve 3 is full-closed.

The surge tank 4 is connected to a combustion chamber 10 of the internal combustion engine 9 by way of an intake passage 7 and an intake valve 8. A fuel injection valve 11 is partially projected into the intake passage 7 in each cylinder of the internal combustion engine 9. Fuel is injected into air flowing in the intake passage 7.

The combustion chamber 10 is connected to a catalytic converter 14 by way of an exhaust valve 12 and an exhaust passage 13. An ignition plug 15 is provided partially protruding into the combustion chamber 10. A piston 16 moves up-and-down in a reciprocating motion in FIG. 1.

An igniter 17 generates a high voltage, and the high voltage is distributed to the ignition plug 15 deposited on each cylinder by a distributor 18. A rotation angle sensor 19 detects a crank angle from a rotating angle of a shaft of the distributor 18. For example, the rotation angle sensor 19 outputs a crank angle signal of the internal combustion engine 9 at each 10 degrees of CA (=Crank Angle) and sends the signal to the microcomputer 1. The Rotation angle sensor 19 is one part of a rotation counter for counting a total number of rotations.

Figure 7:
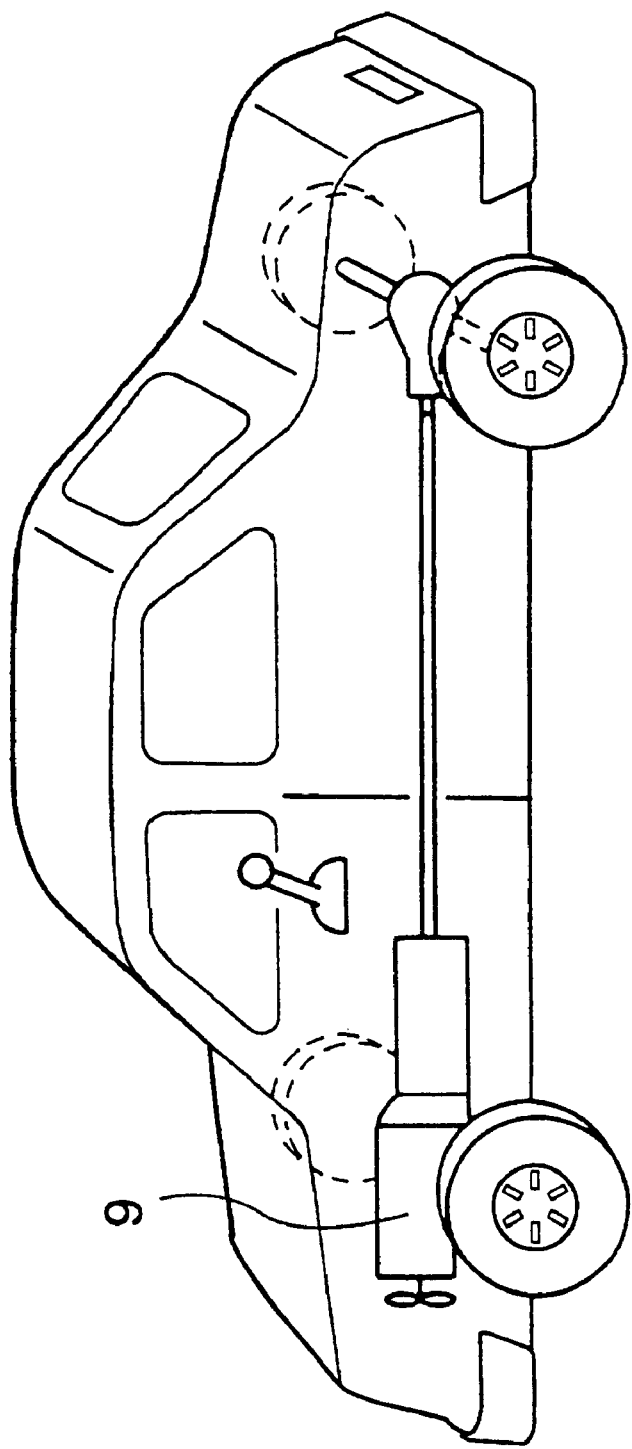
FIG. 7 is a schematic view of a vehicle in which the internal combustion engine 9 having the misfire detecting apparatus is mounted.

A coolant temperature sensor 20 penetrates through an engine block 21, and the end of the coolant temperature sensor 20 protrudes into a water jacket in the internal combustion engine 9. The sensor 20 detects coolant temperature of the engine 9 and outputs a signal of the coolant temperature. An oxygen sensor (also called $O_2$ sensor) 22 detects a concentration of oxygen gas contained in exhaust gas of the internal combustion engine 9 and is deposited in the exhaust passage 13. The end of the oxygen sensor 22 penetrates and protrudes into the exhaust passage 13. A warning light 23 is connected to the microcomputer 1. The warning light 23 is turned on when the fuel injection system has something wrong and notifies a driver of a vehicle with the engine 9 (shown in FIG. 7) of an abnormality of the fuel injection system, that is an abnormal condition of the engine 9.

Figure 2:
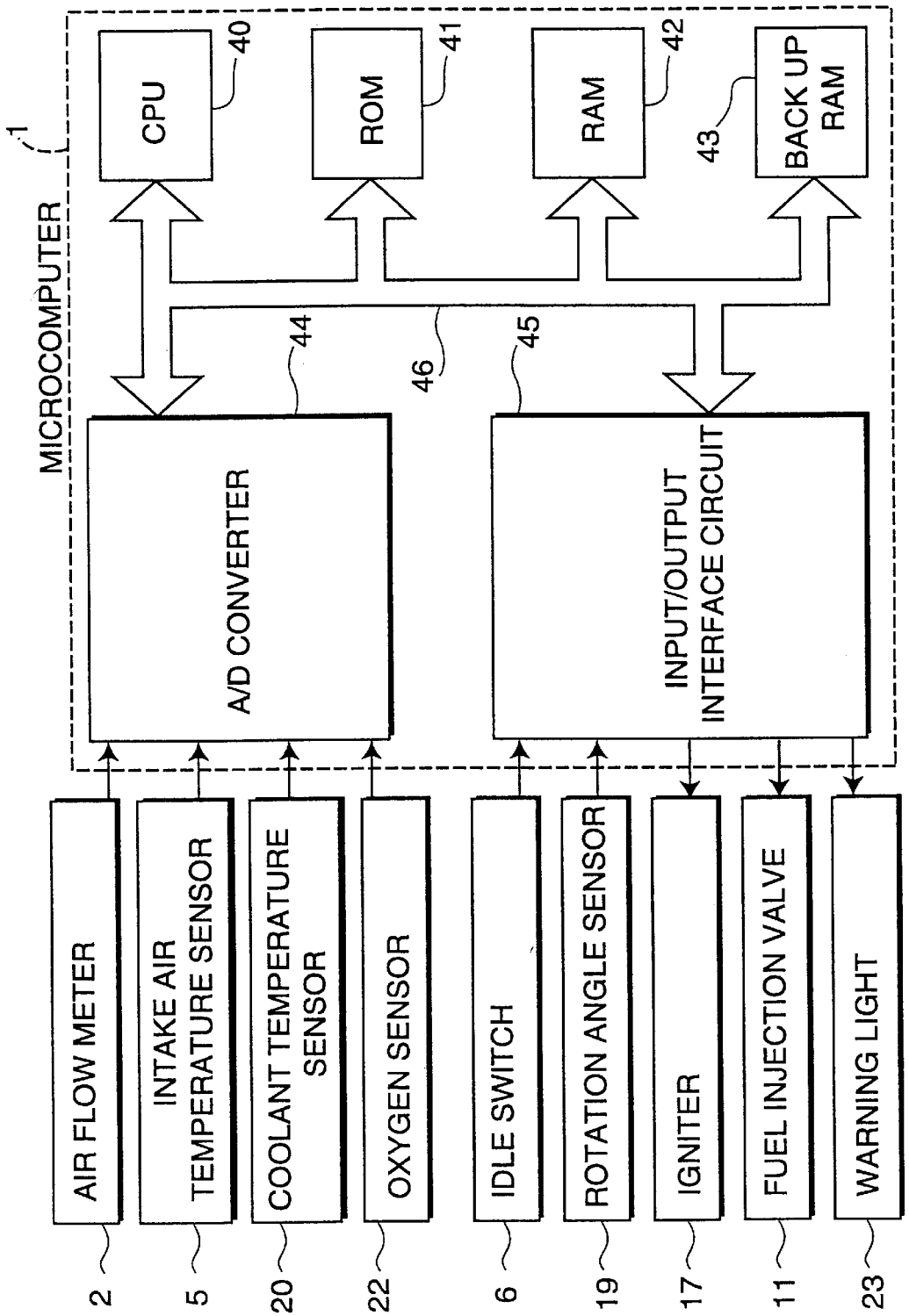
FIG. 2 shows a hardware structure of the microcomputer 1 shown in FIG. 1 and a block diagram illustrating a relationship between the microcomputer 1 and sensors which send signals to the microcomputer 1, parts to which the microcomputer 1 send signals, or etc.

The microcomputer 1 shown in FIG. 1 has such a hardware structure as shown in FIG. 2. The same parts in FIG. 1 and FIG. 2 are given the same numbers, and the overlapping explanation is here omitted.

In FIG. 2, the microcomputer 1 comprises a CPU (Central Processing Unit) 40, a ROM (Read Only Memory) 41 which contains a processing program, a RAM (Random Access Memory) 42 which is used as an operating area, a Backup-RAM 43 which holds data after the internal combustion engine 9 stops, an A/D converter 44, an I/O (Input/ Output) Interface Circuit 45, etc. They are connected together by a bus 46.

The A/D converter 44 in order receives a signal of an intake air amount from the air flow meter 2, a signal of intake air temperature from the intake temperature sensor 5, a signal of coolant temperature from the coolant temperature sensor 20, and a signal of oxygen concentration from the oxygen sensor 22. The A/D converter 44 converts from analog data to digital data and in order sends signals to the bus 46.

The I/O interface circuit 45 inputs a detected signal from the idle switch 6 and a signal of revolutions from the rotation angle sensor 19 and sends signals to the CPU 40 by way of the bus 46. On the other hand, the I/D interface circuit 45 inputs each signal from the bus 46 and sends it to the fuel injection valve 11, the igniter 17, or the warning light 23. An interval of the fuel injection from the fuel injection valve 11 is then controlled. When the signal indicating the ignition from the igniter 17 is inputted, primary electric current of an ignition coil is cut off and the ignition plug 15 is ignited.

Figure 3:
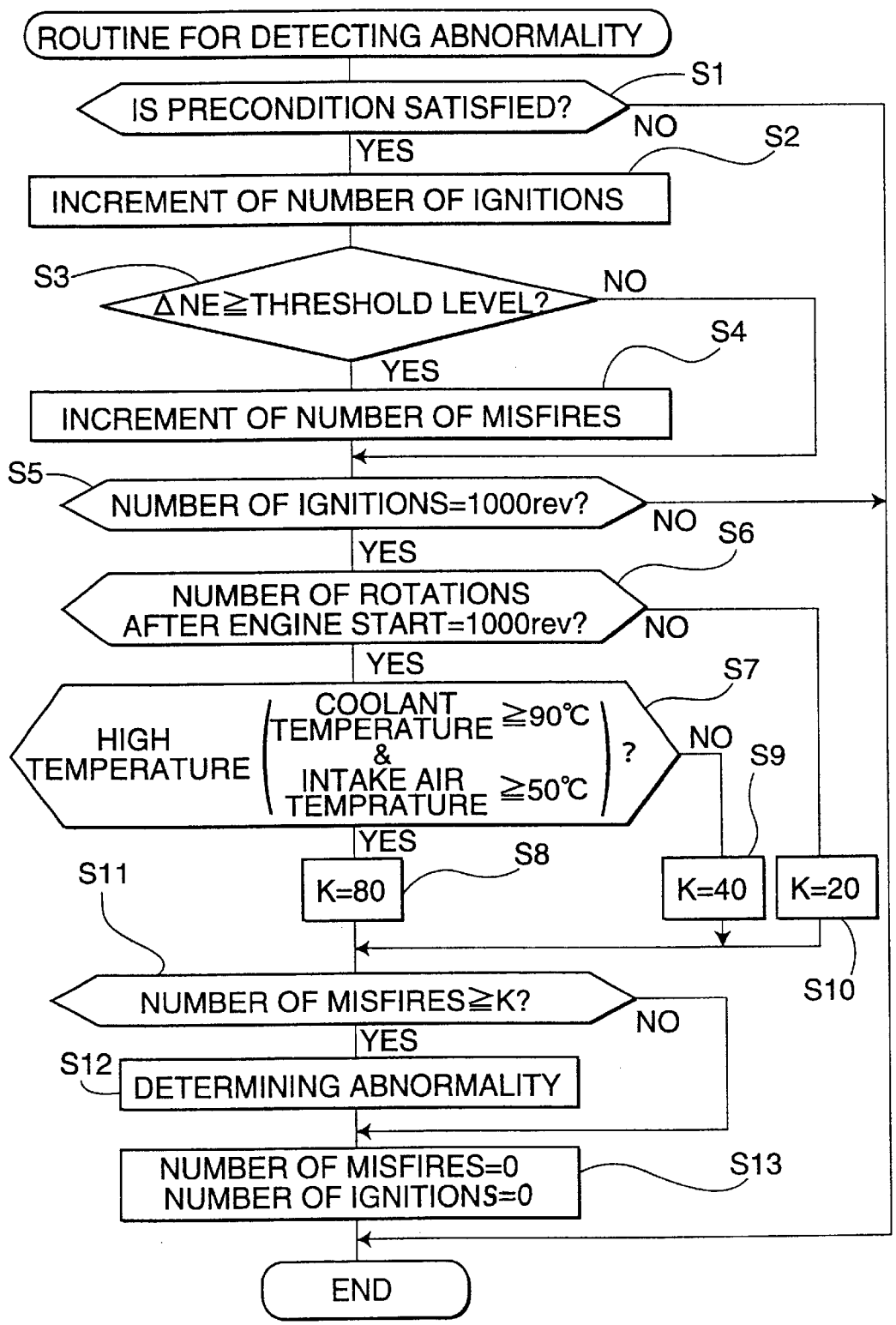
FIG. 3 is a flowchart showing a detecting routine of an abnormality of the engine 9 for the misfire detecting apparatus of the present invention.

The above-mentioned microcomputer 1 executes procedures shown in steps of the flowchart shown in FIG. 3, according to a program contained in the ROM 41.

Next, a flowchart showing an abnormality detecting routine for the misfire detecting apparatus is explained as an embodiment of the present invention, using FIG. 3.

In step 1 (hereinafter S1 is used, and other steps are described in the same way), whether a precondition for detecting a misfire is satisfied or not is determined. Such a precondition, for example, as that coolant temperature of the engine 9 is equal to or higher than −10° C. and revolution of the engine 9 is equal to or higher than 450 rpm is adopted. When "yes" is determined, the routine proceeds to S2. When "no" is determined, the step jumps to END, and the routine ends.

In S2, a number of ignitions is increased by 1 in the microcomputer 1. This function responds to a rotation counter. The routine transitions to S3. This increment in S2 is for counting a total number of rotations of the engine 9.

In S3, whether rotation fluctuation Δ NE of the engine 9 is equal to or higher than a threshold level is determined. When "yes" is determined, the control goes to S4. On the other hand, when "no" is determined, the step skips S4 to S5. Incidentally, this step S3 is for detecting the misfire of the engine 9.

Next, in S4, a number of misfires is increased by 1 in the microcomputer 1. This function is for counting the number of misfires and is used for calculating a rate of misfire which is a number of misfires per a predetermined total number of rotations.

Figure 4:
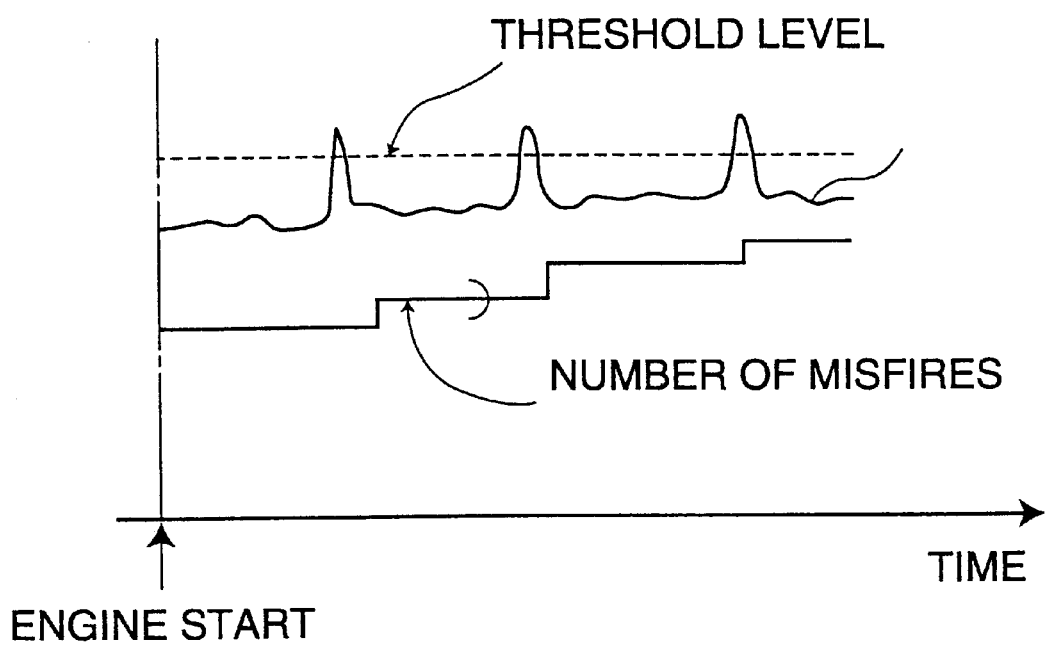
FIG. 4 is a graph showing rotation fluctuation Δ NE of the engine 9 and a number of misfires to an elapsed time after starting the engine 9.

The steps S3 and S4 are further explained in detail, using FIG. 4. FIG. 4 is a graph showing the rotation fluctuation Δ NE of the internal combustion engine 9 and a number of misfires versus an elapsed time after starting the engine 9. As shown in FIG. 4, at each time when the rotation fluctuation Δ NE crosses over the threshold level, the number of misfires is increased by 1.

In S5, whether the number of ignitions (that is, the total number of rotations) is 1000 or not is determined. When "yes" is determined, the routine transitions to S6, and when "no" is determined, the step jumps to END. Incidentally, the number 1000 is the above-mentioned predetermined total number of rotations in this case. This number is, however, not limited to 1000, and other numbers are also available.

In S6, whether the total number of rotations reaches 1000 for the first time after starting the engine 9 or not is determined. When "yes" is determined, the routine proceeds to S7. On the other hand, when "no" is determined, the step goes to S10.

S7 is for determining the starting condition of the engine 9. In S7, whether the temperature of the engine 9 is high or not is determined. As factors for determining the starting condition of the engine 9, the coolant temperature and the intake air temperature are adopted. In detail, whether the coolant temperature is equal to or higher than 90° C. and the intake air temperature is equal to or higher than 50° C. are determined. When "yes" is determined, the routine goes to S8, and when "no", the routine proceeds to S9. Incidentally, it is also available that the coolant temperature or the intake air temperature is adopted for a factor for determining the starting condition of the engine 9. Furthermore, concerning the coolant temperature and the intake air temperature, it is not limited to 90° C. and 50° C. The lower limit of the coolant temperature or the intake air temperature can be appropriately set by considering the condition of the engine 9.

Next, in S8 the basic rate of misfire K is set to 80. After K=40 is set in S9 or K=20 is set in S10, the step proceeds to S11. It is not limited for K to 80, 40, or 20, respectively in S8, S9, or S10. It is also available that other numbers could be set as the basic rate of misfire K in S8, S9, or S10. The number is appropriately selected in response to the condition of the engine 9. It is desirable that the rate of misfire K in S8 >the rate of misfire K in S9>the rate of misfire K in S10.

The rate of misfire K in S8, S9, or S10 is calculated and varied per the predetermined total number of rotations given in S5 or S6. The basic rate of misfire K after the total number of rotations reaches 1000 after starting the engine 9 is lower than the basic rate of misfire K when the total number of rotations is less than or equal to 1000. It is also available that the basic rate of misfire K is set in response to an elapsed time after starting the engine 9, in place of the total number of rotations.

Next, in S11, whether the number of misfires is equal to or more than K or not is determined. If "yes" is determined the routine goes to S12, and if "no" is determined, the step skips to S13. In S12, the engine 9 is found abnormal, and the warning light 23 shown in FIG. 2 is turned on. A driver of a vehicle having the engine 9 (shown in FIG. 7) is notified by the lighting of the warning light 23. Then, the step proceeds to S13.

In S13, the number of misfires and the number of ignitions are reset, that is, each number is set to 0. Finally, the routine ends.

Figure 5:
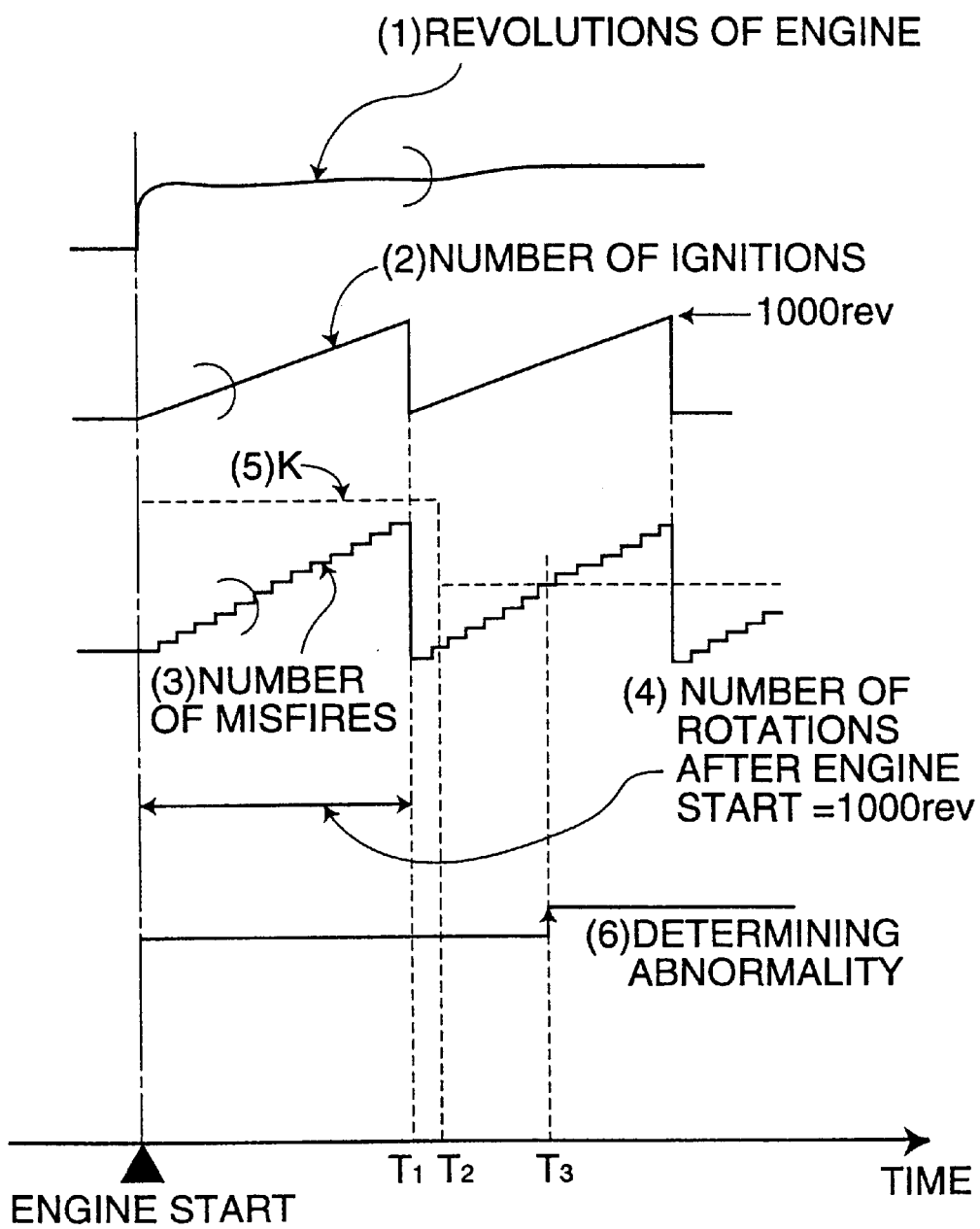
FIG. 5 is a graph showing revolutions of the engine 9, a number of ignitions, a number of misfires, and a determination whether the engine 9 is abnormal or not, to an elapsed time after starting the engine 9.

The control from S4 to S13 is further explained in detail, using FIG. 5. FIG. 5 is a graph showing the revolutions of the engine 9, the number of ignitions, and the number of misfires to the elapsed time after starting the engine 9. Furthermore, in FIG. 5, whether the engine 9 is abnormal or not is determined. The numbered curves in FIG. 5 show the following situations.

(1) The revolutions of the engine increase after the engine 9 starts in FIG. 5.

(2) The total number of rotations (that is the number of ignitions) of the engine 9 increases straight, responding to the elapsed time, as shown by the number of ignitions in FIG. 5. When the total number of rotations reaches 1000, that is the elapsed time is $T_1$, the control is reset. After 1000 is counted, the same counting as mentioned above again starts. These routines repeat again and again.

(3) The number of misfires is counted, when the rotation fluctuation $\Delta$ NE is equal to or higher than the threshold level. Counting the number of misfires continues accumulatively until it reaches 1000. As mentioned above, the elapsed time responding to 1000 is $T_1$ in FIG. 5. When the total number of rotations (=the number of ignitions) gets to 1000 while the number of misfires is less than the basic misfire rate K, the total number of rotations and the number of misfires are reset to 0. The same routine as this repeatedly continues.

(4) The first total number of rotations 1000 indicates that the number of ignitions is 1000 for the first time after starting the engine 9.

(5) When the total number of rotations is 1000 for the first time, the basic rate of misfire K is set to 80 or 40. After the total number of rotations reaches 1000 for the first time, the basic rate of misfire K is set to 20. In FIG. 5, when the time reaches the time $T_2$ after the elapsed time arrives at $T_1$, 20 is set as the basic rate of misfire. This basic rate of misfire K=20 continues after $T_2$.

(6) When the number of misfires is equal to or higher than the basic rate of misfire K at the time $T_3$, the engine 9 is determined to be abnormal.

Figure 6:
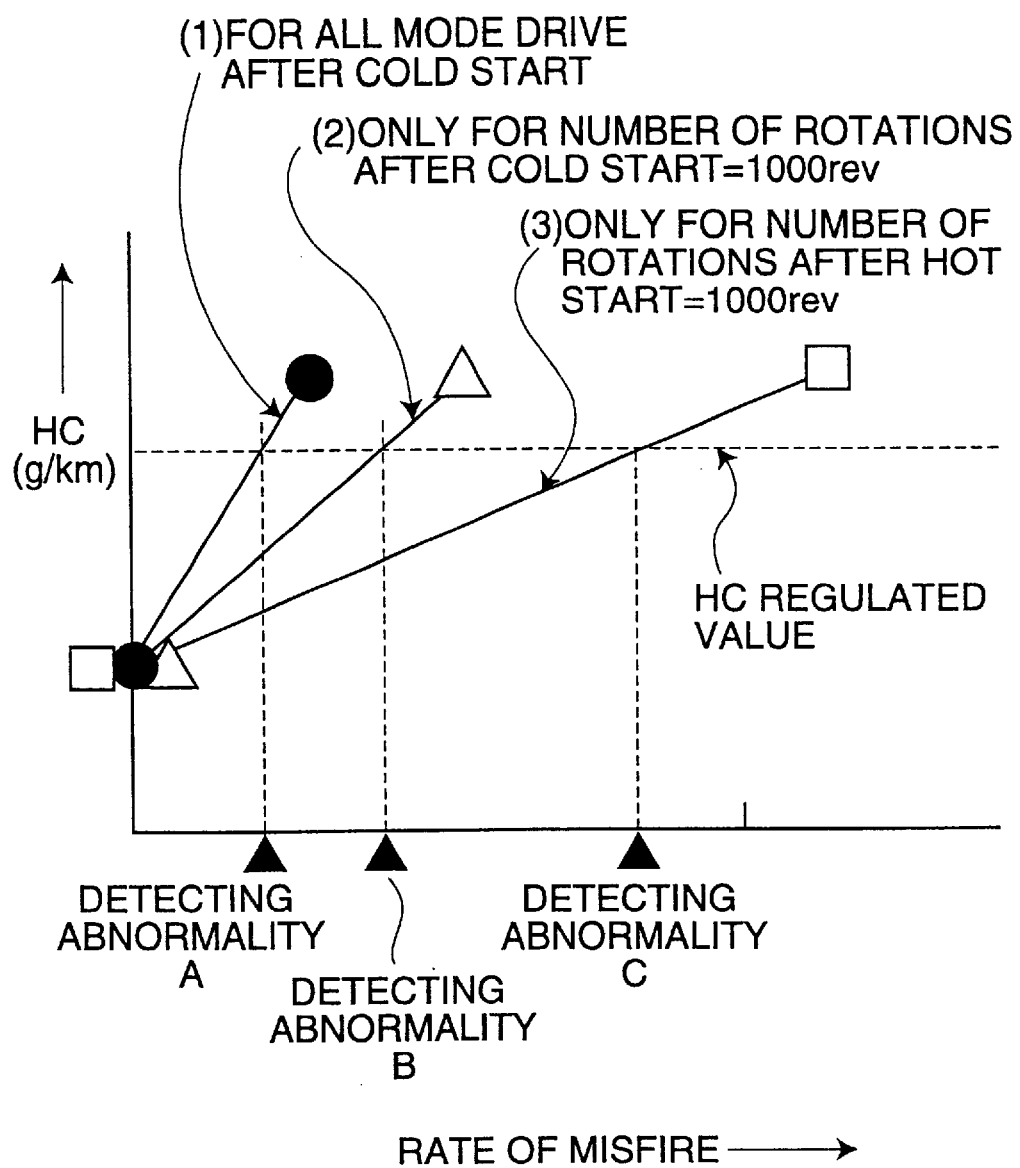
FIG. 6 is a graph showing a relationship between a rate of misfire (horizontal axis) and an amount of hydrocarbon HC (vertical axis) as one example of an emission of the engine 9, for each start condition of the engine.

Next, using FIG. 6, it is explained why it is necessary that the basic rate of misfire varies in response to the starting condition of the engine 9. In FIG. 6, an amount of exhausted hydrocarbon HC (g/km) after starting the engine 9 is shown by the vertical line, and the rate of misfire is shown by the horizontal line. Incidentally, when the amount of HC reaches the HC regulated value ×1.5, it is detected that the engine 9 is abnormal.

The straight line (1) in FIG. 6 indicates that the detected amount of HC is equal to the HC regulated value ×1.5 when the rate of misfire is A for all mode drive (that is, a predetermined test mode) after cold start of the engine 9. The value A corresponds to 20 (the basic rate of misfire K=20 at S10 in FIG. 3).

The straight line (2) indicates that the detected amount of HC is equal to the HC regulated value ×1.5 when the rate of misfire is B only for a condition that the total number of rotations for the first time after cold start of the engine 9 is 1000. Concerning a characteristic of an internal combustion engine, just after starting the engine in cold condition, the rotation fluctuation $\Delta$ NE is higher, and an accuracy of detecting a misfire of the engine is lower. The value B corresponds to 40 (the basic rate of misfire K=40 at S9 in FIG. 3). Consequently, the value B is lower than the value C as explained later.

The straight line (3) indicates that the detected amount of HC is equal to the HC regulated value ×1.5 when the rate of misfire is C only for the total number of rotations after hot start of the engine 9 is 1000 for the first time. When an internal combustion engine is hot, the emission condition is good (that is, the amount of HC is low), because the temperature of the catalytic converter is high. Namely, the amount of HC in the hot start condition K is lower than the amount of HC in the cold start condition. Consequently, the basic rate of misfire of the hot start condition can be higher than for the cold start condition. The value C corresponds to 80 (the basic rate of misfire K=80 at S80 in FIG. 3).

As mentioned above, in the misfire detecting apparatus of the present invention, the basic rate of misfire determined under the condition that the catalytic converter is cold and the ability of cleansing the emission by the catalytic converter is low is adopted to the basic rate of misfire under the mild temperature condition and the cold start condition. A possibility of misfire is low in the mild temperature condition. On the other hand, high value is adopted to the basic rate of misfire under the hot start condition. In the hot start condition the misfire is possible, though the ability of cleansing the emission by the catalytic converter is high. By such varying of the basic rate of misfire, a misjudgement of the engine condition will be rare. Furthermore, the engine condition can be determined more accurately.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for detecting a misfire of an internal combustion engine comprising a controller that:
   determines a starting condition of the internal combustion engine, the starting condition is a condition of the internal combustion engine when the internal combustion engine is initially started;
   counts a total number of rotations of the internal combustion engine;
   detects a misfire of the internal combustion engine;
   calculates a rate of misfire using data from detecting said misfire, the rate of misfire being a number of misfires per a predetermined total number of rotations;
   sets a basic rate of misfire in response to the determined starting condition of the internal combustion engine; and
   determines an abnormal condition of the internal combustion engine when said calculated rate of misfire is greater than the set basic rate of misfire;
   wherein said controller determines the abnormal condition of the internal combustion engine by a coolant temperature or an intake air temperature of the internal combustion engine.

2. An apparatus for detecting a misfire of an internal combustion engine comprising a controller that:
   determines a starting condition of the internal combustion engine, the starting condition is a condition of the internal combustion engine when the internal combustion engine is initially started;
   counts a total number of rotations of the internal combustion engine;
   detects a misfire of the internal combustion engine;
   calculates a rate of misfire using data from detecting said misfire, the rate of misfire being a number of misfires per a predetermined total number of rotations;
   sets a basic rate of misfire in response to the determined starting condition of the internal combustion engine; and
   determines an abnormal condition of the internal combustion engine when said calculated rate of misfire is greater than the set basic rate of misfire;
   wherein said controller determines the abnormal condition of the internal combustion engine by a coolant temperature and an intake air temperature of the internal combustion engine.

3. An apparatus for detecting a misfire of an internal combustion engine comprising a controller that:
   determines a starting condition of the internal combustion engine, the starting condition is a condition of the internal combustion engine when the internal combustion engine is initially started;
   counts a total number of rotations of the internal combustion engine;
   detects a misfire of the internal combustion engine;
   calculates a rate of misfire using data from detecting said misfire, the rate of misfire being a number of misfires per a predetermined total number of rotations;
   sets a basic rate of misfire in response to the determined starting condition of the internal combustion engine;
   determines an abnormal condition of the internal combustion engine when said calculated rate of misfire is greater than the set basic rate of misfire; and
   warns of an abnormality of the internal combustion engine when said abnormal condition of the internal combustion engine is determined;
   wherein said controller sets the basic rate of misfire when the internal combustion engine starts in a normal condition lower than a basic rate of misfire when the internal combustion engine starts in a high temperature condition.

4. An apparatus for detecting a misfire of an internal combustion engine comprising a controller that:
   determines a starting condition of the internal combustion engine, the starting condition is a condition of the internal combustion engine when the internal combustion engine is initially started;
   counts a total number of rotations of the internal combustion engine;
   detects a misfire of the internal combustion engine;
   calculates a rate of misfire using data from detecting said misfire, the rate of misfire being a number of misfires per a predetermined total number of rotations;
   sets a basic rate of misfire in response to the determined starting condition of the internal combustion engine; and
   determines an abnormal condition of the internal combustion engine when said calculated rate of misfire is greater than the set basic rate of misfire;
   wherein said controller varies the basic rate of misfire in response to the total number of rotations.

5. An apparatus for detecting a misfire of an internal combustion engine comprising a controller that:
   determines a starting condition of the internal combustion engine, the starting condition is a condition of the internal combustion engine when the internal combustion engine is initially started;
   counts a total number of rotations of the internal combustion engine;
   detects a misfire of the internal combustion engine;
   calculates a rate of misfire using data from detecting said misfire, the rate of misfire being a number of misfires per a predetermined total number of rotations;
   sets a basic rate of misfire in response to the determined starting condition of the internal combustion engine; and
   determines an abnormal condition of the internal combustion engine when said calculated rate of misfire is greater than the set basic rate of misfire;
   wherein said controller varies the basic rate of misfire in response to a time elapsed after the internal combustion engine starts.

6. An apparatus for detecting a misfire of an internal combustion engine comprising a controller that:
   determines a starting condition of the internal combustion engine, the starting condition is a condition of the internal combustion engine when the internal combustion engine is initially started;
   counts a total number of rotations of the internal combustion engine;
   detects a misfire of the internal combustion engine;

calculates a rate of misfire using data from detecting said misfire, the rate of misfire being a number of misfires per a predetermined total number of rotations;

sets a basic rate of misfire in response to the determined starting condition of the internal combustion engine; and determines an abnormal condition of the internal combustion engine when said calculated rate of misfire is greater than the set basic rate of misfire;

wherein said controller sets the basic rate of misfire when the total number of rotations is small after the internal combustion engine starts higher than a basic rate of misfire when the total number of rotations is large after the internal combustion engine starts.

7. An apparatus for detecting a misfire of an internal combustion engine comprising a controller that:

determines a starting condition of the internal combustion engine, the starting condition is a condition of the internal combustion engine when the internal combustion engine is initially started;

counts a total number of rotations of the internal combustion engine;

detects a misfire of the internal combustion engine;

calculates a rate of misfire using data from detecting said misfire, the rate of misfire being a number of misfires per a predetermined total number of rotations;

sets a basic rate of misfire in response to the determined starting condition of the internal combustion engine; and determines an abnormal condition of the internal combustion engine when said calculated rate of misfire is greater than the set basic rate of misfire;

wherein said controller sets the basic rate of misfire when a elapsed time is short after the internal combustion engine starts higher than a basic rate of misfire when the elapsed time is long after the internal combustion engine starts.

8. A method for detecting a misfire of an internal combustion engine, comprising the steps of:

determining a starting condition of the internal combustion engine, the starting condition is a condition of the internal combustion engine when the internal combustion engine is initially started;

detecting a misfire of the internal combustion engine;

counting a total number of rotations of the internal combustion engine;

calculating a rate of misfire using data from said misfire detector, the rate of misfire being a number of misfires per a predetermined total number of rotations;

setting a basic rate of misfire in response to the determined starting condition of the internal combustion engine;

determining an abnormal condition of the internal combustion engine when said rate of misfire is greater than the basic rate of misfire;

wherein said determining step comprises the step of:
determining the abnormal condition of the internal combustion engine by a coolant temperature or an intake air temperature of the internal combustion engine.

9. A method for detecting a misfire of an internal combustion engine, comprising the steps of:

determining a starting condition of the internal combustion engine, the starting condition is a condition of the internal combustion engine when the internal combustion engine is initially started;

detecting a misfire of the internal combustion engine;

counting a total number of rotations of the internal combustion engine;

calculating a rate of misfire using data from said misfire detector, the rate of misfire being a number of misfires per a predetermined total number of rotations;

setting a basic rate of misfire in response to the determined starting condition of the internal combustion engine;

determining an abnormal condition of the internal combustion engine when said rate of misfire is greater than the basic rate of misfire;

wherein said determining step comprises the step of:
determining the abnormal condition of the internal combustion engine by a coolant temperature and an intake air temperature of the internal combustion engine.

10. A method for detecting a misfire of an internal combustion engine, comprising the steps of:

determining a starting condition of the internal combustion engine, the starting condition is a condition of the internal combustion engine when the internal combustion engine is initially started;

detecting a misfire of the internal combustion engine;

counting a total number of rotations of the internal combustion engine;

calculating a rate of misfire using data from said misfire detector, the rate of misfire being a number of misfires per a predetermined total number of rotations;

setting a basic rate of misfire in response to the determined starting condition of the internal combustion engine;

determining an abnormal condition of the internal combustion engine when said rate of misfire is greater than the basic rate of misfire;

wherein said setting step comprises the step of:
setting a low value for the basic rate of misfire when the internal combustion engine starts in a normal condition and setting a high value for the basis rate of misfire when the internal combustion engine starts in a high temperature condition.

11. A method for detecting a misfire of an internal combustion engine, comprising the steps of:

determining a starting condition of the internal combustion engine, the starting condition is a condition of the internal combustion engine when the internal combustion engine is initially started;

detecting a misfire of the internal combustion engine;

counting a total number of rotations of the internal combustion engine;

calculating a rate of misfire using data from said misfire detector, the rate of misfire being a number of misfires per a predetermined total number of rotations;

setting a basic rate of misfire in response to the determined starting condition of the internal combustion engine;

determining an abnormal condition of the internal combustion engine when said rate of misfire is greater than the basic rate of misfire;

wherein said setting step comprises the step of:
varying the basic rate of misfire in response to the total number of rotations.

12. A method for detecting a misfire of an internal combustion engine, comprising the steps of:
- determining a starting condition of the internal combustion engine, the starting condition is a condition of the internal combustion engine when the internal combustion engine is initially started;
- detecting a misfire of the internal combustion engine;
- counting a total number of rotations of the internal combustion engine;
- calculating a rate of misfire using data from said misfire detector, the rate of misfire being a number of misfires per a predetermined total number of rotations;
- setting a basic rate of misfire in response to the determined starting condition of the internal combustion engine;
- determining an abnormal condition of the internal combustion engine when said rate of misfire is greater than the basic rate of misfire;
- wherein said setting step comprises the step of:
  - varying the basic rate of misfire in response to a time elapsed after the internal combustion engine starts.

13. A method for detecting a misfire of an internal combustion engine, comprising the steps of:
- determining a starting condition of the internal combustion engine, the starting condition is a condition of the internal combustion engine when the internal combustion engine is initially started;
- detecting a misfire of the internal combustion engine;
- counting a total number of rotations of the internal combustion engine;
- calculating a rate of misfire using data from said misfire detector, the rate of misfire being a number of misfires per a predetermined total number of rotations;
- setting a basic rate of misfire in response to the determined starting condition of the internal combustion engine;
- determining an abnormal condition of the internal combustion engine when said rate of misfire is greater than the basic rate of misfire;
- wherein said setting step comprises the step of:
  - setting a high value for the basic rate of misfire when the total number of rotations is small after the internal combustion engine starts and setting a low value when the total number of rotations is large after the internal combustion engine starts.

14. A method for detecting a misfire of an internal combustion engine, comprising the steps of:
- determining a staring condition of the internal combustion engine, the starting condition is a condition of the internal combustion engine when the internal combustion engine is initially started;
- detecting a misfire of the internal combustion engine;
- counting a total number of rotations of the internal combustion engine;
- calculating a rate of misfire using data from said misfire detector, the rate of misfire being a number of misfires per a predetermined total number of rotations;
- setting a basic rate of misfire in response to the determined starting condition of the internal combustion engine;
- determining an abnormal condition of the internal combustion engine when said rate of misfire is greater than the basic rate of misfire;
- wherein said setting step comprises the step of:
  - setting a high value for the basic rate of misfire whena elapsed time is short after the internal combustion engine starts and setting a low value when the elapsed time is long after the internal combustion engine starts.

* * * * *